US012058791B2

(12) United States Patent
Hu

(10) Patent No.: US 12,058,791 B2
(45) Date of Patent: Aug. 6, 2024

(54) BACKLIGHT BOARD, BACKLIGHT MODULE, AND DISPLAY DEVICE

(71) Applicant: TCL CHINA STAR OPTOELECTRONICS TECHNOLOGY CO., LTD., Shenzhen (CN)

(72) Inventor: Daobing Hu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 372 days.

(21) Appl. No.: 17/600,507

(22) PCT Filed: Aug. 27, 2021

(86) PCT No.: PCT/CN2021/114934
§ 371 (c)(1),
(2) Date: Sep. 30, 2021

(87) PCT Pub. No.: WO2023/015618
PCT Pub. Date: Feb. 16, 2023

(65) Prior Publication Data
US 2023/0217563 A1 Jul. 6, 2023

(30) Foreign Application Priority Data
Aug. 13, 2021 (CN) ......................... 202110932018.5

(51) Int. Cl.
*H05B 45/30* (2020.01)
*G09G 3/32* (2016.01)
*H05B 45/40* (2020.01)

(52) U.S. Cl.
CPC ............. *H05B 45/30* (2020.01); *H05B 45/40* (2020.01)

(58) Field of Classification Search
CPC ........ H05B 45/30; H05B 45/39; H05B 45/40; G09G 3/32; G09G 3/3233; G09G 3/3413; G09G 3/3426
See application file for complete search history.

(56) References Cited

U.S. PATENT DOCUMENTS 8,487,902 B2 * 7/2013 Nako ................ H04N 1/00411 345/174
8,633,480 B2 * 1/2014 Yamazaki ......... H01L 29/42372 257/70

(Continued)

FOREIGN PATENT DOCUMENTS

CN 205751478 U 11/2016
CN 109166532 A 1/2019

(Continued)

*Primary Examiner* — Tung X Le
(74) *Attorney, Agent, or Firm* — The Roy Gross Law Firm, LLC; Roy Gross

(57) ABSTRACT

A backlight board, a backlight module, and a display device are provided. The backlight board includes a substrate, a light-emitting unit, and a packaging block. A control circuit, a first power signal line, and a second power signal line are disposed on the substrate. The light-emitting unit includes a plurality of light-emitting devices. A plurality of first control switches are integrated in the packaging block. The plurality of first control switches are integrated, so that a space occupied by the first control switches in general is reduced, thereby improving the space utilization and level of integration of the backlight board.

19 Claims, 3 Drawing Sheets

(56) References Cited

U.S. PATENT DOCUMENTS

| | | | | |
|---|---|---|---|---|
| 9,370,074 | B2 * | 6/2016 | Kurokawa | H10K 59/65 |
| 11,436,986 | B2 * | 9/2022 | Kim | G09G 3/3266 |
| 2011/0062433 | A1 * | 3/2011 | Yamazaki | H01L 29/7869 257/43 |
| 2014/0253533 | A1 * | 9/2014 | Miyake | G09G 3/3655 345/212 |
| 2016/0284282 | A1 | 9/2016 | Zhang et al. | |
| 2018/0151742 | A1 * | 5/2018 | Kurata | H01L 27/14627 |
| 2019/0371254 | A1 | 12/2019 | Tian | |
| 2020/0257167 | A1 * | 8/2020 | Miyata | G09G 3/3413 |
| 2022/0246099 | A1 * | 8/2022 | Ka | G09G 3/3291 |

FOREIGN PATENT DOCUMENTS

| | | | |
|---|---|---|---|
| CN | 109215584 | A | 1/2019 |
| CN | 208538461 | U | 2/2019 |
| CN | 110930953 | A | 3/2020 |
| CN | 111091787 | A | 5/2020 |
| CN | 210627871 | U | 5/2020 |
| CN | 111429853 | A | 7/2020 |
| CN | 111999936 | A | 11/2020 |
| CN | 112086069 | A | 12/2020 |
| CN | 112310140 | A | 2/2021 |
| CN | 112750397 | A | 5/2021 |

* cited by examiner

BACKLIGHT BOARD, BACKLIGHT MODULE, AND DISPLAY DEVICE

CROSS REFERENCE TO RELATED APPLICATIONS

This application is a National Phase of PCT Patent Application No. PCT/CN2021/114934 having International filing date of Aug. 27, 2021, which claims the benefit of priority of Chinese Application No. 202110932018.5 filed on Aug. 13, 2021. The contents of the above applications are all incorporated by reference as if fully set forth herein in their entirety.

FIELD OF INVENTION

The present disclosure relates to the field of display technologies, and specifically, to a backlight board, a backlight module, and a display device.

BACKGROUND OF INVENTION

As the requirement for picture quality becomes increasingly high in the market of high-end TVs, it becomes a new demand of high-end TVs to improve the picture quality of displays. As a brand new display technology, a submillimeter light-emitting diode (mini LED) or a micro light-emitting diode (micro LED) is advantageous over an organic light-emitting diode (OLED) in brightness and power consumption. In the mini LED or micro LED, backlights in regions may be turned on matching a display picture of a panel, and light in local regions are adjusted to implement million-level contrast.

Based on a current backlight board design, a control switch occupies a particular space, affecting the arrangement of LEDs. In addition, the control switch further affects light reflection at the position, affecting the brightness of a light board. However, to ensure a display effect, as many sub-regions as possible require to be ensured. In this case, a quantity of control switches also increases, and the control switches occupy an excessive space in general, leading to low space utilization and a low level of integration of a backlight board.

SUMMARY OF INVENTION

Technical Problem

Embodiments of the present disclosure provide a backlight board, a backlight module, and a display device, to resolve the problem in the prior art that control switches occupy an excessive space in general, leading to low space utilization and a low level of integration of a backlight board.

Technical Solution

An embodiment of the present disclosure provides a backlight board, including:

a substrate, a control circuit, a first power signal line, and a second power signal line being disposed on the substrate;

a light-emitting unit, disposed on the substrate, and including a plurality of light-emitting devices; and a packaging block, disposed on the substrate, a plurality of first control switches being integrated in the packaging block, the plurality of first control switches corresponding one to one to the plurality of light-emitting devices, wherein each first control switch includes a first connecting terminal, a second connecting terminal, and a control terminal, and each light-emitting device and the corresponding first control switch are connected in series between the first power signal line and the second power signal line; and the control circuit is electrically connected to the control terminal, to control the first connecting terminal and the second connecting terminal to be connected or disconnected.

Optionally, in some embodiments of the present disclosure, second connecting terminals of at least two first control switches in the packaging block are electrically connected together, and the first connecting terminal of the first control switch is electrically connected to the corresponding light-emitting device.

Optionally, in some embodiments of the present disclosure, second connecting terminals of the plurality of first control switches are electrically connected together.

Optionally, in some embodiments of the present disclosure, the first connecting terminal is an input terminal of the first control switch, the second connecting terminal is an output terminal of the first control switch, and output terminals of at least two first control switches are electrically connected together.

Optionally, in some embodiments of the present disclosure, the first connecting terminal is an output terminal of the first control switch, the second connecting terminal is an input terminal of the first control switch, and input terminals of at least two first control switches are electrically connected together.

Optionally, in some embodiments of the present disclosure, a plurality of first power signal lines and a plurality of second power signal lines are disposed on the substrate, the plurality of first power signal lines are electrically connected together, and the plurality of second power signal lines are electrically connected together.

Optionally, in some embodiments of the present disclosure, the control circuit includes a scan driver line, a data driver line, and a second control switch, a control terminal of the second control switch is electrically connected to the scan driver line, an input terminal of the second control switch is electrically connected to the data driver line, and an output terminal of the second control switch is electrically connected to the control terminal of the first control switch.

Optionally, in some embodiments of the present disclosure, at least one of the first control switch and the second control switch is a MOS transistor, a gate of the MOS transistor is the control terminal, a drain of the MOS transistor is the input terminal, and a source of the MOS transistor is the output terminal.

Optionally, in some embodiments of the present disclosure, the MOS transistor is an N-channel MOS transistor or a P-channel MOS transistor.

Optionally, in some embodiments of the present disclosure, the first control switch and the second control switch are MOS transistors.

Optionally, in some embodiments of the present disclosure, the substrate includes a light-emitting sub-region corresponding to each light-emitting device, and the packaging block is located at a joint between adjacent light-emitting sub-regions.

Optionally, in some embodiments of the present disclosure, the light-emitting unit includes four light-emitting devices, the four light-emitting devices are distributed in a matrix, the first power signal line is located between two columns of light-emitting devices, the second power signal line is located between two rows of light-emitting devices, and the packaging block is located at an intersection between the first power signal line and the second power signal line.

Optionally, in some embodiments of the present disclosure, the plurality of light-emitting devices are distributed in an array.

Optionally, in some embodiments of the present disclosure, each light-emitting device includes one or more light-emitting elements.

Optionally, in some embodiments of the present disclosure, each light-emitting element includes an LED light, and the LED lights are of different colors.

Correspondingly, the embodiments of the present disclosure further provide a backlight module, including any foregoing backlight board.

Optionally, in some embodiments of the present disclosure, the backlight module further includes a back panel and an optical diaphragm group, wherein the backlight board is disposed on the back panel, and the optical diaphragm group is laminated on the backlight board.

Optionally, in some embodiments of the present disclosure, a concave groove is provided in the back panel, and the backlight board and the optical diaphragm group are disposed in the concave groove.

Correspondingly, the embodiments of the present disclosure further provide a display device, including the backlight module Optionally, in some embodiments of the present disclosure, the display device further includes a display panel, a drive circuit, and a casing; and the display panel is connected to the casing, the drive circuit is located in the casing, and the drive circuit is electrically connected to the display panel.

Beneficial Effects

In the backlight board provided in the embodiments of the present disclosure, a plurality of first control switches are integrated in a packaging block on a substrate. Compared with the arrangement of only one control switch in a conventional packaging block, it can be implemented that a plurality of light-emitting devices are simultaneously controlled in a packaging block region, so that a space occupied by the first control switches in general is reduced, thereby avoiding the impact of the addition of the first control switches on the light-emitting effect of the backlight board, and improving space utilization and the level of integration of the backlight board.

BRIEF DESCRIPTION OF DRAWINGS

To describe the technical solutions in the embodiments of the present disclosure more clearly, the following briefly describes accompanying drawings required for describing the embodiments. Apparently, the accompanying drawings in the following descriptions show merely some embodiments of the present disclosure, and a person skilled in the art may still derive other accompanying drawings from these accompanying drawings without creative efforts.

Descriptions of numerals in the drawings.

Figure 1:
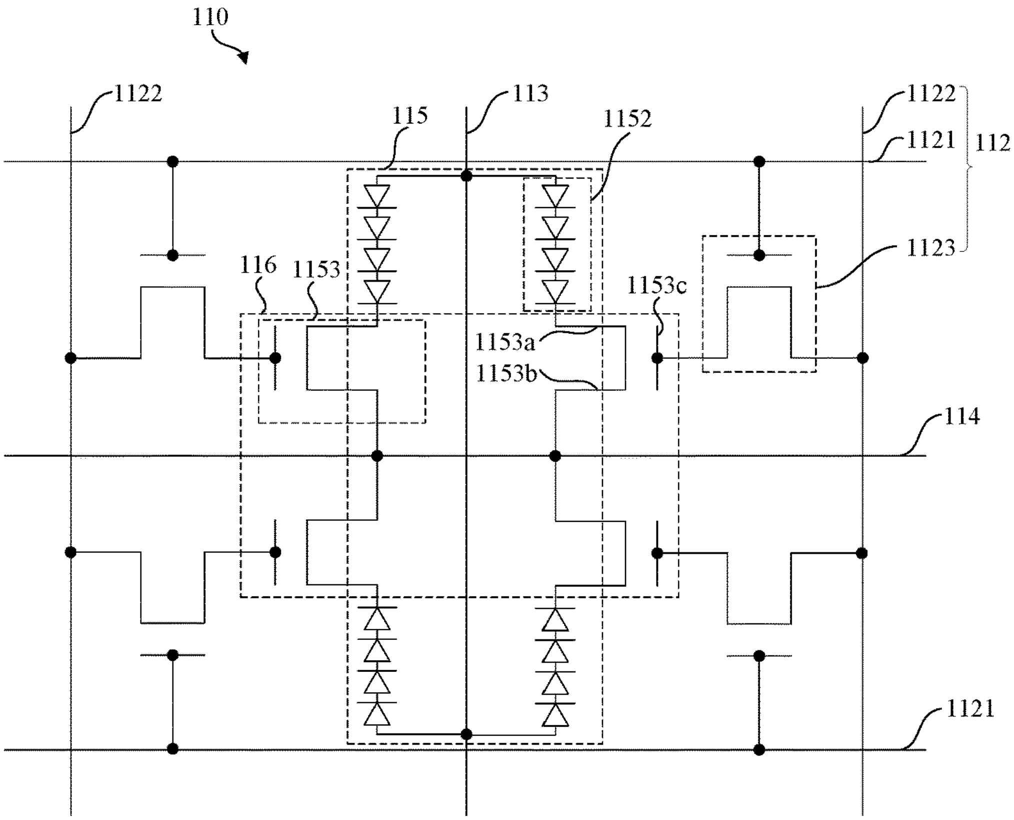
FIG. 1 is a schematic diagram of a circuit of a backlight board according to an embodiment of the present disclosure.

| Reference numerals | Part names | Reference numerals | Part names |
|---|---|---|---|
| 10 | display device | 1153 | first control switch |
| 100 | backlight module | 1153a | first connecting terminal |
| 110 | backlight board | 1153b | second connecting terminal |
| 111 | substrate | 1153c | control terminal |
| 112 | control circuit | 1153d | gate |
| 1121 | scan driver line | 1153e | source |
| 1122 | data driver line | 1153f | drain |
| 1123 | second control switch | 116 | packaging block |
| 113 | first power signal line | 120 | back panel |
| 114 | second power signal line | 130 | optical diaphragm group |
| 115 | light-emitting unit | 200 | display panel |
| 1152 | light-emitting device | 300 | drive circuit |
| | | 400 | casing |

DETAILED DESCRIPTION OF PREFERRED EMBODIMENTS

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure rather than limiting the present disclosure. In the present disclosure, without stating the contrary, orientation terms such as "up" and "down" usually refer to the top and bottom of the device in its actual use or operating condition, specifically the orientation of the drawing in the accompanying drawings, while "inside" and "outside" refer to the outline of the device.

Embodiments of the present disclosure provide a backlight board, a backlight module, and a display device. Detailed descriptions are separately provided below. The description sequence of the following embodiments is not intended to limit preference orders of the embodiments.

First, the embodiments of the present disclosure provide a backlight board, including a substrate, a light-emitting unit, and a packaging block. A control circuit, a first power signal line, and a second power signal line are disposed on the substrate. The light-emitting unit is disposed on the substrate. The light-emitting unit includes a plurality of light-emitting devices. The packaging block is disposed on the substrate. A plurality of first control switches are integrated in the packaging block. The plurality of first control switches correspond one to one to the plurality of light-emitting devices. Each first control switch includes a first connecting terminal, a second connecting terminal, and a control terminal. Each light-emitting device and the corresponding first control switch are connected in series between the first power signal line and the second power signal line. The control circuit is electrically connected to the control terminal, to control the first connecting terminal and the second connecting terminal to be connected or disconnected.

Figure 2:
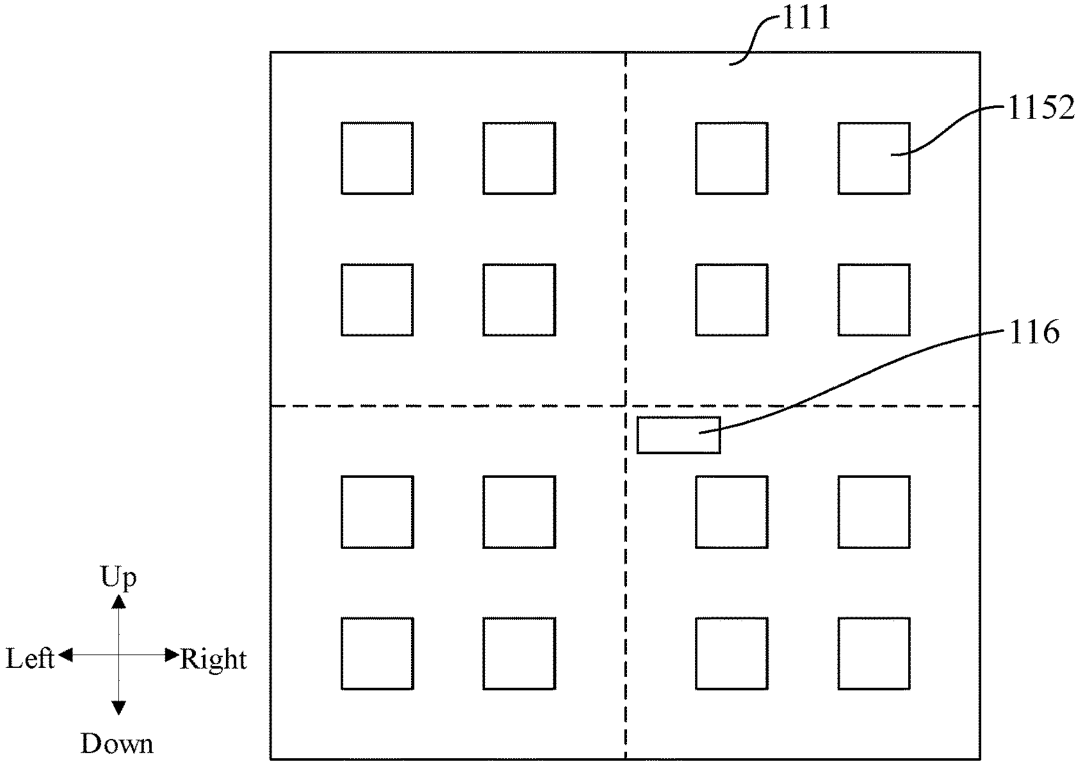
FIG. 2 is a schematic diagram of the distribution of a backlight board according to an embodiment of the present disclosure.

FIGS. 1 and 2 are respectively schematic diagrams of the circuit and distribution of a backlight board according to an embodiment of the present disclosure. As shown in FIGS. 1 and 2, a backlight board 110 includes a substrate 111, a light-emitting unit 115, and a packaging block 116. A control circuit 112, a first power signal line 113, and a second power signal line 114 are disposed on the substrate 111, and are configured to control the light-emitting status of the light-emitting unit 115. Through the arrangement of the control circuit 112, backlights can be turned on for different light-emitting units 115 matching a display picture of a panel, so that the contrast of a display panel is adjusted, thereby improving the display picture quality of the display panel.

It requires to be noted that, the substrate 111 used in the embodiments of the present disclosure may be a glass substrate, a printed circuit substrate or the like. This is not limited herein.

The light-emitting unit 115 is disposed on the substrate 111. Through the design of the arrangement and connection manner of the light-emitting unit 115 and the control circuit 112, different control manners of the light-emitting unit 115 by the control circuit 112 can be implemented, thereby implementing the regulation of the light-emitting status of the light-emitting unit 115, to provide different backlight sources to the display panel.

The light-emitting unit 115 may include a plurality of light-emitting devices 1152. Through the design of layout positions of the plurality of light-emitting devices 1152, light-emitting regions of the light-emitting unit 115 can be regulated, thereby satisfying different backlight demands. In addition, electrical connection manners between the light-emitting devices 1152 and the control circuit 112 may be adjusted according to a design demand, thereby simplifying circuit wiring and control manners.

Each light-emitting device 1152 may include one or more light-emitting elements. A plurality of light-emitting element may be connected in series and used as light-emitting light sources for the backlight board 110, to provide the display panel with backlights. The arrangement manner and arrangement positions of the light-emitting elements may be designed matching a display picture of a panel, thereby improving the contrast and display picture quality of the display panel.

It requires to be noted that, the light-emitting elements in the embodiments of the present disclosure may be LED lights. The LED light may be of different colors. Through the coordination between the LED lights of different colors, different backlight sources may be provided to the display panel. The demands of the display panel for different backlight sources can be satisfied by adjusting the quantity, colors, and arrangement manner of the LED lights.

The packaging block 116 is further disposed on the substrate 111 of the backlight board 110. A plurality of first control switches 1153 are integrated in the packaging block 116. The plurality of first control switches 1153 correspond one to one to the plurality of light-emitting devices 1152. The plurality of first control switches 1153 are integrated together, so that one packaging block 116 provides a plurality of switch functions, and the plurality of light-emitting devices 1152 can be simultaneously regulated.

Each first control switch 1153 and the corresponding light-emitting device 1152 are connected in series between the first power signal line 113 and the second power signal line 114, and are configured to control whether to conduct a current in the light-emitting device 1152. The first power signal line 113 and the second power signal line 114 may provide a direct current signal to the plurality of light-emitting devices 1152. The direct current signal is used for turning on the light-emitting devices 1152 and the first control switches 1153. Through the design of a connection manner between the first control switch 1153 and the light-emitting device 1152, a current direction in the light-emitting device 1152 may be changed, so that the layout of the first power signal line 113 and the second power signal line 114 is designed, to optimize wires on the substrate 111 of the backlight board 110.

It requires to be noted that, each light-emitting device 1152 has a resistance value. If the light-emitting device 1152 includes a plurality of light-emitting elements, when a direct current signal outputted by the first power signal line 113 or the second power signal line 114 flows through the plurality of light-emitting elements, due to the occurrence of a voltage drop, a voltage value gradually decreases. To ensure that the plurality of light-emitting elements are normally turned on, the direct current signal outputted by the first power signal line 113 or the second power signal line 114 may be adjusted according to resistance values of the light-emitting elements in the light-emitting device 1152 and a quantity of the light-emitting elements, thereby ensuring that the light-emitting stability of the light-emitting devices 1152 and the overall display brightness and display uniformity of the backlight board 110.

The first control switch 1153 in the embodiments of the present disclosure may include a first connecting terminal 1153*a*, a second connecting terminal 1153*b*, and a control terminal 1153*c*. The control circuit 112 is electrically connected to the control terminal 1153*c* to control the first connecting terminal 1153*a* and the second connecting terminal 1153*b* to be connected or disconnected. When the first connecting terminal 1153*a* is connected to the second connecting terminal 1153*b*, the light-emitting device 1152 and the first control switch 1153 form a current path, and the light-emitting device 1152 emits light. Through the adjustment of the control signal of the control circuit 112, the conduction status of different first control switches 1153 may be controlled, thereby controlling the light-emitting status of different light-emitting devices 1152.

It requires to be noted that, a wiring foot is disposed on the surface of the packaging block 116, and is configured to electrically connect the first control switch 1153 to another structure. The plurality of first control switches 1153 are integrated together, to help reduce an area occupied by the first control switches 1153 in general, thereby reducing the impact of the first control switch 1153 on the light-emitting effect of the backlight board 110, and also help improve the space utilization and level of integration of the backlight board 110.

Optionally, the second connecting terminals 1153*b* of the at least two first control switches 1153 in the embodiments of the present disclosure are electrically connected together. That is, the at least two first control switches 1153 may share one interface. During wiring on the substrate 111 of the backlight board 110, the wiring manner can be simplified, and in addition, the area occupied by the first control switches 1153 in general can be reduced, thereby reducing the impact of the overall light-emitting effect on the backlight board 110 by the first control switch 1153, and improving the level of integration of the backlight board 110.

It requires to be noted that, when the second connecting terminals 1153*b* of the at least two first control switches 1153 are electrically connected together, it may mean that the second connecting terminals 1153*b* of the first control switches 1153 are connected by a wire on the substrate 111, or it may mean that the at least two first control switches 1153 share one second connecting terminal 1153*b*. Although manufacturing processes of the two manners are different, the same eventual effect is achieved, so that the area occupied by the first control switches 1153 in general can be reduced, thereby improving the level of integration of the backlight board 110.

Optionally, the second connecting terminals 1153*b* of the plurality of first control switches 1153 in the packaging block 116 in the embodiments of the present disclosure may be electrically connected together. That is, the second connecting terminals 1153*b* of all the first control switches 1153 share one wiring port, and it is not necessary to separately perform wiring to connect the second connecting terminal 1153*b* of every first control switch 1153, so that the wiring on the substrate 111 of the backlight board 110 is simpler. In addition, this layout manner can reduce a distance between the first control switches 1153, to help further reduce the area occupied by the first control switches 1153 in general, thereby improving the level of integration of the backlight board 110, reducing the impact on the light-emitting effect of the backlight board 110 by the packaging block 116, and improving the light-emitting uniformity of the backlight board 110.

The plurality of light-emitting devices 1152 may be distributed in an array. That is, the plurality of light-emitting devices 1152 may be distributed in a plurality of rows and a plurality of columns, forming a "2×2 grid" shape in general. The packaging block 116 is located at a middle position close to the light-emitting devices 1152 distributed in an array. This distribution manner can effectively prevent mutual intersection between circuits, thereby simplifying a manufacturing process.

Optionally, the first connecting terminal 1153*a* in the embodiments of the present disclosure may be an input terminal of the first control switch 1153. The second connecting terminal 1153*b* may be an output terminal of the first control switch 1153, and the second connecting terminals 1153*b* of the at least two first control switches 1153 are electrically connected together. That is, output terminals of the at least two first control switches 1153 are electrically connected together, and the input terminals are separately electrically connected to cathodes of the corresponding light-emitting devices 1152.

An anode of the light-emitting device 1152 may be electrically connected to the first power signal line 113. The first power signal line 113 inputs a direct current signal to the light-emitting device 1152. The output terminals of the first control switches 1153 that are electrically connected together may be connected to the second power signal line 114. The second power signal line 114 is connected to the ground. When the first control switches 1153 are turned on, the direct current signal inputted on the first power signal line 113 flows to the first control switch 1153 via the light-emitting device 1152, and the light-emitting device 1152 emits light.

Because the grounding voltage is 0 V, a voltage value difference can be prevented at the output terminals electrically connected together of the different first control switches 1153, to avoid a voltage interference on circuits that are electrically connected together, thereby improving the light-emitting stability of the light-emitting elements, and ensuring the light-emitting uniformity of the backlight board 110.

It requires to be noted that, the first connecting terminal 1153*a* in the embodiments of the present disclosure may be the output terminal of the first control switch 1153, and the second connecting terminal 1153*b* may be the input terminal of the first control switch 1153. That is, input terminals of the at least two first control switches 1153 are electrically connected together. The output terminal of the first control switch 1153 is electrically connected to the anode of the corresponding light-emitting device 1152.

A cathode of the light-emitting device 1152 is connected to the first power signal line 113. The first power signal line 113 is connected to the ground. The input terminals of the first control switches 1153 that are electrically connected together are connected to the second power signal line 114. The second power signal line 114 inputs a direct current signal to the input terminal of the first control switch 1153. When the first control switches 1153 are turned on, the current flows to the light-emitting device 1152 via the first control switch 1153, to enable the light-emitting device 1152 to emit light.

It requires to be noted that connection manners between the first control switch 1153 and the light-emitting device 1152 and the first power signal line 113 and the second power signal line 114 in the embodiments of the present disclosure may be adjusted according to an actual design demand, as long as the second connecting terminals 1153*b* of the at least two first control switches 1153 are electrically connected together to normally implement the adjustment of the light-emitting status of different light-emitting devices 1152.

When the light-emitting unit 115 includes a relatively large quantity of light-emitting devices 1152 and it is not convenient to electrically connect the plurality of light-emitting devices 1152 and first control switches 1153 to one same first power signal line 113 or second power signal line 114, a plurality of first power signal lines 113 or a plurality of second power signal lines 114 may be separately disposed on the substrate 111, the plurality of first power signal lines 113 are electrically connected together, and the plurality of second power signal lines 114 are electrically connected together. Although the quantities of the first power signal lines 113 and the second power signal lines 114 increase, in general the wiring on the substrate 111 of the backlight board 110 is still facilitated.

The control circuit 112 in the embodiments of the present disclosure may include a scan driver line 1121, a data driver line 1122, and a second control switch 1123. A control terminal of the second control switch 1123 is electrically connected to the scan driver line 1121. A scan signal is inputted on the scan driver line 1121, so that it may be controlled whether the second control switch 1123 is turned on. An input terminal of the second control switch 1123 is electrically connected to the data driver line 1122. An output terminal of the second control switch 1123 is electrically connected to the control terminal 1153*c* of the first control switch 1153. A data signal is inputted on the data driver line 1122. In a case that the second control switch 1123 is turned on, the data signal may be delivered to the control terminal 1153*c* of the first control switch 1153 through the second control switch 1123, and is used for controlling the first control switch 1153 to be turned on or off.

The scan driver line 1121 is configured to control whether the second control switch 1123 is turned on. The data driver line 1122 and the second control switch 1123 are configured to control whether the first control switch 1153 is turned on. Through the adjustment of input signals on the scan driver line 1121 and the data driver line 1122, a demand may be matched according to a display picture on a panel, to implement the regulation of the light-emitting status of different light-emitting devices 1152.

It requires to be noted that, the control circuit 112 disposed on the substrate 111 may include a plurality of scan driver lines 1121 and a plurality of data driver lines 1122, which are respectively connected to a plurality of second control switches 1123. Control terminals of the second control switches 1123 located in the same row may be electrically connected together to the same scan driver line 1121, and input terminals of the second control switches 1123 located in the same column may be electrically connected together to the same data driver line 1122.

Whether the second control switch 1123 is turned on is directly correlated to the scan signal inputted on the scan driver line 1121. In a case that the second control switch 1123 is turned on, through the adjustment of the data signal inputted on the data driver line 1122, the first control switch 1153 may be turned on. Therefore, through the joint adjustment of input signals on the scan driver line 1121 and the data driver line 1122, the light-emitting status of the plurality of light-emitting devices 1152 may be simultaneously controlled.

It requires to be noted that when the control terminals of the second control switches 1123 in the same row are electrically connected to the same scan driver line 1121 and the input terminals of the second control switches 1123 in the same column are electrically connected to the same data driver line 1122, the arrangement quantities of the scan driver lines 1121 and the data driver lines 1122 in the control circuit 112 on the substrate 111 can be reduced, so that the wiring on the substrate 111 is more compact, and the wiring of the backlight board 110 and the brightness of the light board are not affected by an increase in the quantity of the light-emitting devices 1152.

Optionally, at least one of the first control switch 1153 and the second control switch 1123 in the embodiments of the present disclosure is a MOS transistor. Because the MOS transistor has highly stable electrical performance and nearly does not change in an extreme condition Vth (threshold voltage), the drive demand of a mini-LED can be adequately satisfied, thereby improving the light-emitting stability of the backlight board 110.

According to different design demands and wiring manners, the MOS transistor used in the embodiments of the present disclosure may be an N-channel MOS transistor or a P-channel MOS transistor. The type of the used MOS transistor is closely correlated to the connection manner between the first control switch 1153 and the light-emitting device 1152. The first control switch 1153 is directly connected to the light-emitting device 1152. The connection of the light-emitting device 1152 may determine the direction of a current in the light-emitting elements, to determine the direction of a current in the first control switch 1153, and the type of the MOS transistor is determined accordingly. Through the mutual coordination between different types of MOS transistors, different wiring design demands can be satisfied.

Figure 3:
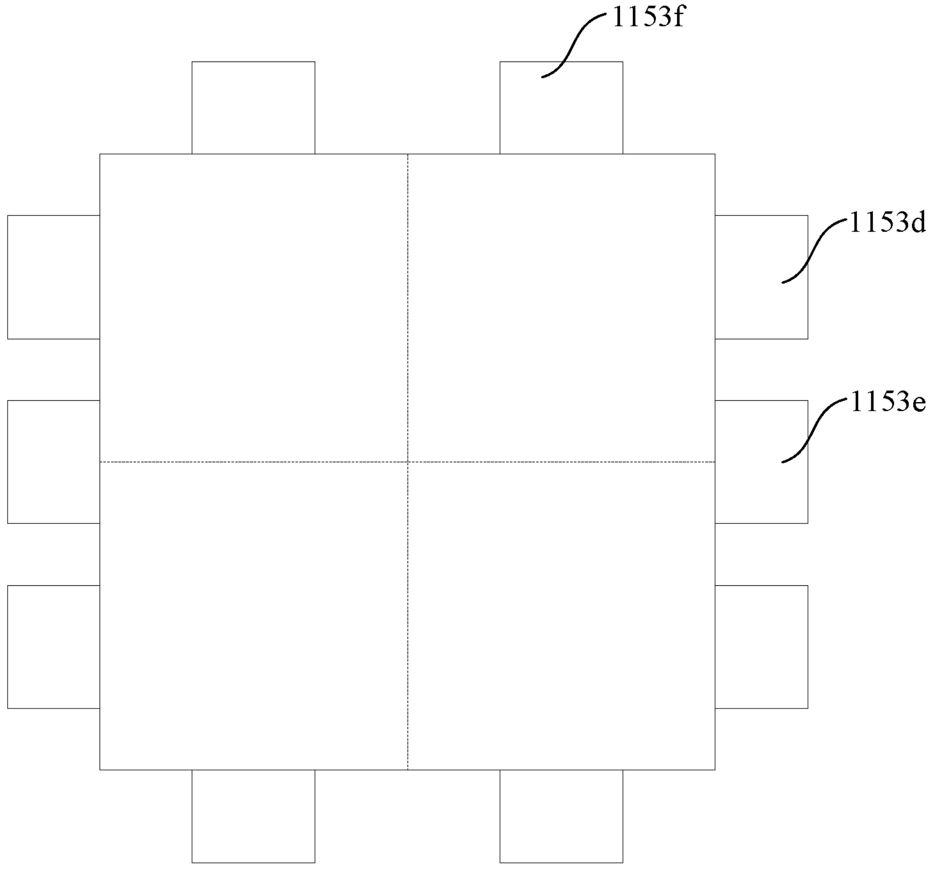
FIG. 3 is a schematic diagram of a structure of the back of a first control switch according to an embodiment of the present disclosure.

Specifically, for example, the first control switch 1153 in the embodiments of the present disclosure is a MOS transistor. FIG. 3 is a schematic diagram of a structure of a back surface of the first control switch 1153 in the packaging block 116. As shown in FIG. 3, the control terminal 1153*c* of the first control switch 1153 is a gate 1153*d* of the MOS transistor, the input terminal is a drain 1153*f* of the MOS transistor, and the output terminal is a source 1153*e* of the MOS transistor. The drain 1153*f* of the MOS transistor is electrically connected to the cathode of the light-emitting device 1152, and the anode of the light-emitting device 1152 is electrically connected to the first power signal line 113. The source 1153*e* of the MOS transistor is electrically connected to the second power signal line 114. The second power signal line 114 is grounded, and the first control switches 1153 located in the same column share one same source 1153*e*. When the light-emitting device 1152 is turned on to emit light, a direct current signal inputted on the first power signal line 113 flows from the drain 1153*f* of the MOS transistor to the source 1153*e* of the MOS transistor via the light-emitting device 1152. According to a current conduction direction, it may be determined that in this case the MOS transistor is an N-channel MOS transistor.

If the connection manner between the light-emitting device 1152 and the MOS transistor is changed to enable the first power signal line 113 to be grounded, the direct current signal inputted on the second power signal line 114 flows to the drain 1153*f* of the MOS transistor via the source 1153*e* of the MOS transistor, and then flows through the light-emitting device 1152, so that the light-emitting device 1152 is turned on to emit light. In this case, the MOS transistor is a P-channel MOS transistor.

Optionally, the first control switch 1153 and the second control switch 1123 in the embodiments of the present disclosure may both be MOS transistors, to further improve the light-emitting stability of the backlight board 110. Certainly, the first control switch 1153 and the second control switch 1123 may be a TFT switch or any other control switch with the same switch function, as long as the second connecting terminals 1153*b* of the at least two first control switches 1153 may be electrically connected together and the light-emitting status of the plurality of light-emitting devices 1152 can be regulated.

In the embodiments of the present disclosure, the regulation of the light-emitting status of the plurality of light-emitting devices 1152 is closely correlated to input signals on the scan driver line 1121 and the data driver line 1122 in the control circuit 112.

Specifically, in an actual working process, when a high level signal is inputted on scan driver lines 1121 in a row, and the input terminals and output terminals of the second control switches 1123 electrically connected to the scan driver lines 1121 in this row are connected. In this case, if a high level signal is also correspondingly inputted on the data driver lines 1122 electrically connected to the input terminals of the second control switches 1123, the input terminals and output terminals of the first control switches 1153 electrically connected to the output terminals of the second control switches 1123 are also connected, and the light-emitting device 1152 emits light.

When input signals on scan driver lines 1121 in a row or data driver lines 1122 in a column change from high level signals to low level signals, the light-emitting devices 1152 electrically connected to the row or the column do not emit light. Therefore, through the adjustment of the input signals on the scan driver lines 1121 and the data driver lines 1122, that is, the light-emitting status of the light-emitting device 1152 may be regulated. When this wiring connection manner is used, a plurality of light-emitting devices 1152 may be simultaneously controlled, thereby improving the level of integration of the backlight board 110.

It requires to be noted that, a value range of the high level signals inputted on the scan driver line 1121 and the data driver line 1122 in the embodiments of the present disclosure is related to the types of the first control switch 1153 and the second control switch 1123, and may be adjusted according to an actual design demand, as long as it is ensured that the inputted high level signals can normally turn on the first control switch 1153 and the second control switch 1123.

Similarly, the direct current signal on the first power signal line 113 or the second power signal line 114 may be alternatively adjusted according to the structure of the light-emitting device 1152 and the quantity of the light-emitting elements in the light-emitting device 1152, as long as it is ensured that the light-emitting elements can emit light normally and stably and the overall light-emitting brightness and light-emitting stability of the backlight board 110 are ensured.

Optionally, the substrate 111 in the embodiments of the present disclosure further includes a light-emitting sub-region corresponding to each light-emitting device 1152. The packaging block 116 may be located at a joint between adjacent light-emitting sub-regions, so that differences in distances between the light-emitting devices 1152 in the light-emitting sub-region and the first control switches 1153 integrated in the packaging block 116 are reduced, to facilitate the connection between the light-emitting device 1152 and the first control switch 1153 and also facilitate the connection between the first control switch 1153 and the control circuit 112, the first power signal line 113, and the second power signal line 114, to simplify a wiring layout.

It requires to be noted that, the joint between adjacent light-emitting sub-regions does not only indicate a position on a joint boundary or may indicate a region range close to a joint boundary, as long as it is ensured that differences in distances between the region and the light-emitting devices 1152 in the light-emitting sub-region do not affect the impact of wires on the backlight board 110 on the light-emitting effect of the light-emitting device 1152.

Optionally, the light-emitting unit 115 may include four light-emitting devices 1152. The four light-emitting devices 1152 are distributed in a matrix. The first power signal line 113 is located between two columns of light-emitting devices 1152, and the second power signal line 114 is located between two rows of light-emitting devices 1152. The packaging block 116 is located at an intersection between the first power signal line 113 and the second power signal line 114. This arrangement manner can avoid that a light-emitting device 1152 on a boundary is excessively far away from the first control switch 1153 in the packaging block 116, thereby reducing the manufacturing process and wiring difficulty of the backlight board 110.

It requires to be noted that, as shown in FIG. 2, the two columns in the embodiments of the present disclosure are two columns that are sequentially distributed from left to right in FIG. 2, and the two rows are two rows that are sequentially distributed from top to bottom in FIG. 2. In a specific use process, related directions may be adjusted according to an actual case. This is not limited herein.

Next, the embodiments of the present disclosure further provide a backlight module. The backlight module includes a backlight board. For a specific structure of the backlight board, reference may be made to the foregoing embodiments. Because all the technical solutions in all the foregoing embodiments are used for the backlight module, all beneficial effects brought by the technical solutions in the foregoing embodiments are at least provided. Details are not described one by one herein again.

Figure 4:
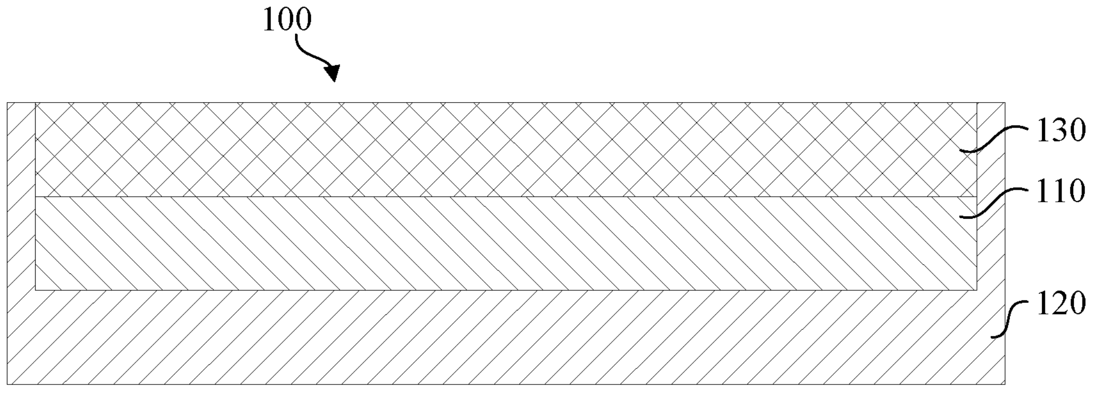
FIG. 4 is a schematic diagram of a structure of a backlight module according to an embodiment of the present disclosure.

FIG. 4 is a schematic diagram of a structure of a backlight module according to an embodiment of the present disclosure. As shown in FIG. 4, a backlight module 100 includes a back panel 120, a backlight board 110, and an optical diaphragm group 130. The backlight board 110 is disposed on the back panel 120. The optical diaphragm group 130 is laminated on the backlight board 110. A plurality of backlight boards 110 may be disposed in a spliced manner on the back panel 120, to prevent a single backlight board 110 from having an excessively large area, thereby reducing the difficulty of a manufacturing process.

It requires to be noted that, a concave groove may be provided in the back panel 120. The backlight board 110 and the optical diaphragm group 130 are disposed in the concave groove. The structure of the concave groove helps restrict the positions of the back panel 120 and the optical diaphragm group 130, to facilitate the assembly of the backlight module 100.

Finally, the embodiments of the present disclosure further provide a display device. The display device includes a backlight module. For a specific structure of the backlight module, reference may be made to the foregoing embodiments. Because all the technical solutions in all the foregoing embodiments are used for the display device, all beneficial effects brought by the technical solutions in the foregoing embodiments are at least provided. Details are not described one by one herein again.

Figure 5:
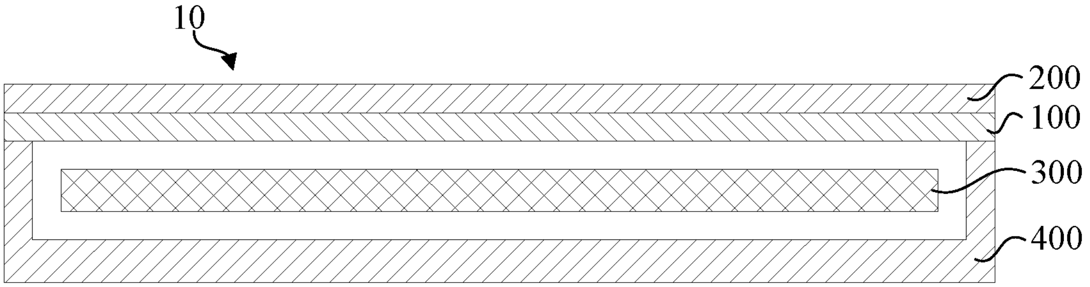
FIG. 5 is a schematic diagram of a structure of a display device according to an embodiment of the present disclosure.

FIG. 5 is a schematic diagram of a structure of a display device according to an embodiment of the present disclosure. As shown in FIG. 5, a display device 10 includes a backlight module, a display panel 200, a drive circuit 300, and a casing 400. The display panel 200 is located on a light exit side of the backlight module. The backlight module may uniformly emit light rays in an entire light exit surface, and is configured to provide the display panel 200 with light rays with sufficient brightness and uniform distribution, to enable the display panel 200 to normally display an image. The casing 400 is connected to the display panel 200 to support and fix the display panel 200. The drive circuit 300 is disposed in the casing 400, and the drive circuit 300 is electrically connected to the display panel 200, to control the display panel 200 to display a picture.

It requires to be noted that the display device 10 in the embodiments of the present disclosure may be a mobile phone, a computer, a digital camera, a digital video camera, a game console, an audio regeneration device, an information terminal, a smart wearable device, a smart weighing electronic scale, a car display, a television or any product or component with a display function.

In the foregoing embodiments, description of each embodiment focuses on a different part, and for parts that are not described in detail in one embodiment, reference may be made to the related description of other embodiments.

The backlight board, the backlight module, and the display device provided in the embodiments of the present disclosure are described above in detail. Although the principles and implementations of the present disclosure are described using specific examples in this specification, the descriptions of the foregoing embodiments are merely intended to help understand the method and the core idea of the method of the present disclosure. In addition, a person skilled in the art may make modifications to the specific implementations and application range according to the idea of the present disclosure. In conclusion, the content of this specification is not construed as a limit on the present disclosure.

What is claimed is:

1. A backlight board, comprising:

a substrate, a control circuit, a first power signal line, and a second power signal line being disposed on the substrate;

a light-emitting unit, disposed on the substrate, and comprising a plurality of light-emitting devices; and a packaging block, disposed on the substrate, a plurality of first control switches being integrated in the packaging block, the plurality of first control switches corresponding one to one to the plurality of light-emitting devices, wherein each of the plurality of first control switches comprises a first connecting terminal, a second connecting terminal, and a control terminal, and each of the plurality of light-emitting devices and the corresponding first control switch are connected in series between the first power signal line and the second power signal line; and the control circuit is electrically connected to the control terminal, to control the first connecting terminal and the second connecting terminal to be connected or disconnected; and wherein the control circuit comprises a scan driver line, a data driver line, and a second control switch, a control terminal of the second control switch is electrically connected to the scan driver line, an input terminal of the second control switch is electrically connected to the data driver line, and an output terminal of the second control switch is electrically connected to the control terminal of the first control switch.

2. The backlight board as claimed in claim 1, wherein second connecting terminals of at least two first control switches in the packaging block are electrically connected together, and the first connecting terminal of the first control switch is electrically connected to the corresponding light-emitting device.

3. The backlight board as claimed in claim 1, wherein second connecting terminals of the plurality of first control switches are electrically connected together.

4. The backlight board as claimed in claim 1, wherein the first connecting terminal is an input terminal of the first control switch, the second connecting terminal is an output terminal of the first control switch, and output terminals of at least two first control switches are electrically connected together.

5. The backlight board as claimed in claim 1, wherein the first connecting terminal is an output terminal of the first control switch, the second connecting terminal is an input terminal of the first control switch, and input terminals of at least two first control switches are electrically connected together.

6. The backlight board as claimed in claim 1, wherein a plurality of first power signal lines and a plurality of second power signal lines are disposed on the substrate, the plurality of first power signal lines are electrically connected together, and the plurality of second power signal lines are electrically connected together.

7. The backlight board as claimed in claim 1, wherein at least one of the first control switch and the second control switch is a metal oxide semiconductor (MOS) transistor, a gate of the MOS transistor is the control terminal, a drain of the MOS transistor is the input terminal, and a source of the MOS transistor is the output terminal.

8. The backlight board as claimed in claim 7, wherein the MOS transistor is an N-channel MOS transistor or a P-channel MOS transistor.

9. The backlight board as claimed in claim 7, wherein the first control switch and the second control switch are MOS transistors.

10. The backlight board as claimed in claim 1, wherein the substrate comprises a light-emitting sub-region corresponding to each light-emitting device, and the packaging block is located at a joint between adjacent light-emitting sub-regions.

11. The backlight board as claimed in claim 1, wherein the light-emitting unit comprises four light-emitting devices, the four light-emitting devices are distributed in a matrix, the first power signal line is located between two columns of light-emitting devices, the second power signal line is located between two rows of light-emitting devices, and the packaging block is located at an intersection between the first power signal line and the second power signal line.

12. The backlight board as claimed in claim 1, wherein the plurality of light-emitting devices are distributed in an array.

13. The backlight board as claimed in claim 1, wherein each light-emitting device comprises one or more light-emitting elements.

14. The backlight board as claimed in claim 13, wherein each light-emitting element comprises an light-emitting diode (LED) light, and the LED lights are of different colors.

15. A backlight module, comprising the backlight board as claimed in claim 1.

16. The backlight module as claimed in claim 15, further comprising a back panel and an optical diaphragm group, wherein the backlight board is disposed on the back panel, and the optical diaphragm group is laminated on the backlight board.

17. The backlight module as claimed in claim 16, wherein a concave groove is provided in the back panel, and the backlight board and the optical diaphragm group are disposed in the concave groove.

18. A display device, comprising the backlight module as claimed in claim 15.

19. The display device as claimed in claim 18, wherein the display device further comprises a display panel, a drive circuit, and a casing; and the display panel is connected to the casing, the drive circuit is located in the casing, and the drive circuit is electrically connected to the display panel.

* * * * *